US012768419B2

(12) United States Patent
Goncalves et al.

(10) Patent No.: US 12,768,419 B2
(45) Date of Patent: Oct. 20, 2026

(54) BRAKE SHOE CONFIGURED TO EQUIP A RAILWAY BRAKING SYSTEM COMPRISING A BRAKE LINKAGE, RAILWAY BRAKING SYSTEM PROVIDED WITH SUCH A BRAKE SHOE, AND RAILWAY VEHICLE PROVIDED WITH SUCH A SYSTEM

(71) Applicant: WABTEC Hauts-de-France, Amiens (FR)

(72) Inventors: Claudino Goncalves, Ribeaucourt (FR); Denis Gerber-Papin, l'Etoile (FR)

(73) Assignee: WABTEC Hauts-de-France, Amiens (FR)

( * ) Notice: Subject to any disclaimer, the term of this patent is extended or adjusted under 35 U.S.C. 154(b) by 303 days.

(21) Appl. No.: 18/712,480

(22) PCT Filed: Nov. 18, 2022

(86) PCT No.: PCT/FR2022/052118
§ 371 (c)(1),
(2) Date: May 22, 2024

(87) PCT Pub. No.: WO2023/089280
PCT Pub. Date: May 25, 2023

(65) Prior Publication Data

US 2025/0020182 A1 Jan. 16, 2025

(30) Foreign Application Priority Data

Nov. 22, 2021 (FR) ....................................... 2112300

(51) Int. Cl.
*F16D 69/04* (2006.01)
*B61H 5/00* (2006.01)
(Continued)

(52) U.S. Cl.
CPC ........... *F16D 69/0408* (2013.01); *B61H 5/00* (2013.01); *F16D 65/0043* (2013.01); *F16D 65/095* (2013.01); *F16D 2069/0433* (2013.01)

(58) Field of Classification Search
CPC ..... B61H 5/00; F16D 65/0043; F16D 65/095; F16D 69/0408; F16D 2069/0433
See application file for complete search history.

(56) References Cited

FOREIGN PATENT DOCUMENTS

| | | | |
|---|---|---|---|
| DE | 2547522 | A1 | 4/1977 |
| DE | 102009006290 | A1 | 7/2010 |

(Continued)

OTHER PUBLICATIONS

International Search Report and Written Opinion for corresponding International PCT Application No. PCT/FR2022/052118, mailed Jan. 18, 2023.

*Primary Examiner* — Thomas W Irvin
(74) *Attorney, Agent, or Firm* — K&L Gates LLP

(57) ABSTRACT

The invention relates to a brake shoe configured to equip a railway braking system for a railway vehicle and to act on at least one braking member of said railway vehicle, comprising a locking and unlocking mechanism having a locking and unlocking member (123) hingedly mounted with respect to a main plate (116) and extending in a transverse direction of the brake shoe, and a safety member (124) mechanically fastened to the main plate (116) as well as to the locking and unlocking member, the locking and unlocking member (123) being provided with a gripping portion (150, 280, 390) which projects transversely beyond the main plate (116), and which is configured to move the locking and unlocking member (123) and the safety member (124).

19 Claims, 7 Drawing Sheets

(51) Int. Cl.

| | |
|---|---|
| ***F16D 65/00*** | (2006.01) |
| ***F16D 65/095*** | (2006.01) |

(56) References Cited

FOREIGN PATENT DOCUMENTS

| | | | |
|---|---|---|---|
| WO | 2020025306 | A1 | 2/2020 |
| WO | 2023089280 | A1 | 5/2023 |

BRAKE SHOE CONFIGURED TO EQUIP A RAILWAY BRAKING SYSTEM COMPRISING A BRAKE LINKAGE, RAILWAY BRAKING SYSTEM PROVIDED WITH SUCH A BRAKE SHOE, AND RAILWAY VEHICLE PROVIDED WITH SUCH A SYSTEM

CROSS-REFERENCE TO RELATED APPLICATIONS

This application is a U.S. National Stage Entry under 35 U.S.C. § 371 of International Patent Application No. PCT/FR2022/052118, entitled BRAKE SHOE CONFIGURED TO EQUIP A RAILWAY BRAKING SYSTEM COMPRISING A BRAKE LINKAGE, RAILWAY BRAKING SYSTEM PROVIDED WITH SUCH A BRAKE SHOE, AND RAILWAY VEHICLE PROVIDED WITH SUCH A SYSTEM, filed Nov. 18, 2022, which claims benefit to French Application No. FR2112300, filed Nov. 22, 2021, the entire disclosures of which are hereby incorporated by reference herein.

TECHNICAL FIELD OF THE INVENTION

The invention relates to the field of railway vehicle braking. In particular, it relates to a brake shoe configured to equip a railway braking system including a brake linkage.

The invention also relates to a braking system for a railway vehicle having brakes with at least one lining, provided with a brake linkage and at least one brake shoe, configured to act on braking members of the vehicle, such as brake discs for example, by means of the brake linkage and the at least one brake shoe.

The invention also relates to a railway vehicle having brakes with at least one lining, including such a braking system configured to act on the braking members of the vehicle, such as brake discs, for example.

STATE OF THE ART

So-called railway vehicles having brakes with at least one lining are generally equipped with braking systems with service and/or parking brake cylinders, including a piston being movable when subjected to a pressurised fluid, the movement of this piston actuating a brake linkage and causing a braking action such as the application of a brake disc by the lining(s) of this linkage.

Such a braking system is mounted to the railway vehicle, to be in contact with the brake discs or with the wheels. In particular, it can be mechanically fastened to a bogie, or to an axle fixed to the bogie, or to another device such as a drive motor or gearbox also mounted to the bogie.

The braking action generates braking forces on the linings and therefore on the brake shoes and more generally on the rest of the system via the brake linkage. Because of these forces, which cause wear to the linings, it is necessary, on the one hand, to mechanically fasten the linings to the brake shoes and, on the other hand, to provide a locking and unlocking mechanism for installing and removing the linings onto/from the brake shoes.

In particular, FIGS. 1 to 4 of the appended drawings show an example of such a braking system mounted to a railway vehicle.

FIG. 1 illustrates a partial front view of this railway braking system, which is especially equipped with a brake linkage mounted to a brake disc of a railway vehicle, with the linings fixedly installed onto the brake shoes of the system. In FIG. 1, only one brake shoe and one lining are visible.

FIG. 2 shows the system alone, in perspective and with one lining fixedly mounted to one brake shoe while the other lining is removed from another brake shoe using a tool.

FIG. 3 is a partial bottom view of FIG. 2, showing a step in the action of unlocking the brake shoe to remove the lining still present.

FIG. 4 is similar to FIG. 3, showing a second step in the action of unlocking the brake shoe, with the lining removed.

The railway braking system 1 illustrated in FIG. 1 is here mounted to a brake disc 2 of a railway vehicle (not represented).

The brake disc 2 can be mounted to an axle of the railway vehicle, or directly to a wheel to be braked (not visible).

The railway braking system 1 includes a body 2 forming a service brake cylinder fed by a pneumatic duct network (not visible), and a brake linkage 4 mechanically connected to the body 2.

The body 2 is in the form of an overall closed casing which is configured to be mechanically fastened to a support of the vehicle, for example a portion of the bogie or axle, via a fixing interface 5.

When the service brake housed in the body 3 is actuated, the brake linkage 4 is moved so as to act on the disc 2.

In particular, the brake linkage 4 is provided with a lining device 5 provided to apply forces to the brake disc 2 when the linkage 4 is actuated.

This device 5 includes two brake shoes 6, to each of which linings 7 are mechanically fastened.

Each lining 7 is provided to be applied in contact with one face of the disc 2 to reduce its speed of rotation and consequently that of the wheel to be braked.

The brake linkage 4 includes levers 8 which extend from the body 2 to the device 5 and at one end of which the brake shoes 6 are mechanically fastened.

Actuation of the levers 8 can move the brake shoes 6 towards or away from each other and the disc 2.

The system 1 includes force transmission links 10 mechanically fastened by a first respective end to the fixing interface 5 (itself fastened to the support of the vehicle, not represented) and by a second respective end opposite to the first end, to a respective brake shoe 6.

In particular, each brake shoe 6 is provided with an attachment lug 11 to which a respective link 10 is mechanically fastened, and with an attachment zone 12 to which a respective lever 8 is mechanically fastened.

Such an arrangement is described in more detail, for example, in French patent FR 3 102 129.

The device 5, including the brake shoes 6 and the linings 7, have a general longitudinal orientation and a general transverse orientation.

The linings 7 are each provided with a leading face 13 configured to be in contact with the brake disc and a mounting face 14 on which is provided a fixing rib 15 which extends longitudinally and which here has a dovetail shape.

The brake shoes 6 are each provided with a main plate 16 having an outer face 17 on which the attachment lug 11 and the attachment zone 12 are provided, and an inner face 18 opposite to the outer face 17 and on which a longitudinal groove 19 is provided (visible in FIGS. 3 and 4).

The longitudinal groove 19 has a complementary shape to the fixing rib 15 of a respective lining 7, and is configured to slidably receive this respective fixing rib 15 for installing the respective lining 7 onto the respective brake shoe 6.

The brake shoes 6 are further each provided with a window 20 provided in the plate 16 and opening on either side into the inner and outer faces 18 and 17 and into the longitudinal groove 19 provided in the inner face 18.

The brake shoes 6 are further each provided with a first protrusion 21 and a second protrusion 22 provided projecting from the outer face 17 of the plate 16 and disposed on either side of the window 20, along the transverse direction of the respective brake shoe 6.

In the example illustrated, the brake shoes 6 are arranged so that the attachment zone 12 is interposed between the attachment lug 11 and the first and second protrusions 21 and 22.

The first and second protrusions 21 and 22 each have a knuckle shape.

The brake shoes 6 are further each provided with a locking and unlocking member 23 hingedly mounted to the first protrusion 21 and extending along the transverse direction from the first protrusion 21 to the second protrusion 22.

The brake shoes 6 are further each provided with a safety member 24 formed here by a wire spring element, of the hairpin type, a first portion 25 of which is mechanically fastened to the second protrusion 22, and a second portion 26 of which is mechanically fastened to the locking and unlocking member 23.

In particular, the first portion 25 of the safety member 24 is introduced and fixed into the knuckles formed by the second protrusion 22, while the second portion 26 is introduced and fixed into a port 27 provided in the locking and unlocking member 23.

The locking and unlocking member 23 has, at an end opposite to that by which it is hinged to the first protrusion 21, a hook-shaped finger 28 which defines a space 29 for passing the first portion 25 of the safety member 24 when the respective brake shoe 6 is in a locked configuration (as in FIGS. 1 and 3).

In such a locked configuration, a portion of the locking and unlocking member 23 passes through the window 20 and comes in tight abutment against a portion of the fixing rib 15 of the respective lining 7, so as to hold the latter in position on the respective brake shoe 6.

Furthermore, in such a locked configuration, the finger 28 of the locking and unlocking member 23 is introduced into the knuckles formed by the second protrusion 22, with the first portion 25 of the safety member 24 being received in the space 29 defined by the finger 28.

In this locked configuration, the attachment points of the safety member 24 are such that this member is in a first stable position in which it stresses the locking and unlocking member 23 against the respective lining 7.

The locking and unlocking member 23 and the safety member 24 together form the locking and unlocking mechanism for installing and removing the linings onto/from the brake shoes.

To replace a lining 7, it is necessary to use a tool, for example a screwdriver, in order to switch the respective brake shoe 6 from its locked configuration (FIGS. 1 and 3) to an unlocked configuration (FIGS. 2 and 4).

In particular, a screwdriver 30 fitted with a shank 31 is used. The shank 31 of the screwdriver 30 is provided with an end 32 which is introduced between the first and second portions 25 and 26 of the safety member 24, outside the second protrusion 22, so as to abut on the first portion 25 and stress the second portion 26 in order to, on the one hand, move the locking and unlocking member 23 away from the lining 7 and, on the other hand, extract the finger 28 from the second protrusion 22.

Sufficient force has to be exerted to move the second portion 25 of the safety member 24 sufficiently until the latter no longer stresses the locking and unlocking member 23 towards the lining 7.

FIGS. 2 to 4 show the general orientation of the screwdriver 30, which has to be positioned along the transverse direction of extension of the brake shoe and the lining, almost completely offset from the latter, to switch the brake shoe from its locked configuration to its unlocked configuration.

In the unlocked configuration, the attachment points of the safety member 24 are such that this member is in a second stable position in which it stresses the locking and unlocking member 23 at a distance from the respective lining 7.

In other words, the lining 7 can thus be removed from the respective brake shoe 6 for replacement.

Once the lining 7 has been replaced, switching the brake shoe from its unlocked configuration to its locked configuration can be performed by pressing the locking and unlocking member 23 directly towards the window 20 with a tool.

DISCLOSURE OF THE INVENTION

The invention relates to a brake shoe configured to equip a railway braking system including a brake linkage, of the type described above, and which is simple, convenient and economical.

In a first aspect, one object of the invention is thus a brake shoe configured to equip a railway braking system for a railway vehicle and to act on at least one braking member of said railway vehicle, including a main plate having an outer face and an inner face opposite to the outer face, a mounting member provided on the inner face and configured to receive a complementary member for mounting a lining equipping the railway braking system, and a locking and unlocking mechanism configured to install/remove and lock/unlock the lining onto/from the brake shoe, the locking and unlocking mechanism including a locking and unlocking member hingedly mounted with respect to the main plate and extending in a transverse direction of the brake shoe, and a safety member mechanically fastened on the one hand to the main plate and on the other hand to the locking and unlocking member, with the brake shoe being configured to assume a locked configuration in which the safety member stresses the locking and unlocking member towards the main plate into a locking position where the locking and unlocking member is configured to be in abutment against the lining, and an unlocked configuration in which the safety member stresses the locking and unlocking member to place it at a distance from the main plate into an unlocked position where the locking and unlocking member is configured to be at a distance from the lining, the brake shoe being characterised in that the locking and unlocking member is provided with a gripping portion which extends projecting transversely beyond the main plate, and which is configured to move the locking and unlocking member and the safety member together to switch the brake shoe from one of its locked and unlocked configurations to the other, when subjected to an external stress.

By virtue of the gripping portion of the brake shoe according to the invention, it is particularly easy to switch the brake shoe from one of its locked and unlocked configurations to the other.

Because of the forces involved in the railway braking system, the external stress can be applied by a user using a tool, such as a screwdriver.

Besides, due to the presence of the gripping portion, it is more convenient to act directly on this gripping portion than on the safety member.

Furthermore, the fact that the gripping portion extends projecting transversely beyond the main plate of the brake shoe makes its actuation particularly convenient, even in spite of the tool.

It is in fact possible to position the tool along a main longitudinal direction of the main plate to access the gripping portion, thus requiring a reduced space around the brake shoe.

Preferred, simple, convenient and economical characteristics of the brake shoe according to the invention are set forth below.

The gripping portion can be formed by a handling member which has a locking face and an unlocking face opposite to the locking face.

The locking face and the unlocking face can have an overall curved shape, for example a concave shape directed towards the handling member, configured to facilitate the positioning of a tool.

The gripping portion can be formed by a handling lug having a through port for introducing a tool.

The gripping portion can be formed by a handling rod fixed integrally in a hole provided in the locking and unlocking member, against which handling rod a tool comes in abutment in order to switch the brake shoe from one of its locked and unlocked configurations to the other.

The brake shoe can include a first protrusion and a second protrusion provided projecting from the outer face, and the locking and unlocking member is hingedly mounted to the first protrusion and extends along the transverse direction from the first protrusion to the second protrusion.

The brake shoe can include a window provided in the main plate and opening on either side into the inner face and into the outer face and located facing the mounting member.

The first protrusion and the second protrusion can be disposed on either side of the window, in a transverse direction of the brake shoe.

The brake shoe can be provided with a positioning stop which projects from the outer face of the main plate and here extends at a distance from the second protrusion.

The positioning stop can be located substantially facing the second protrusion and at least partially opposite the gripping portion.

The positioning stop has a shape that is substantially curved towards the second protrusion so as to form a housing configured to accommodate one end of a tool.

The brake shoe can be provided with an obstacle-forming wall which projects from the outer face of the main plate and which extends in immediate proximity to the second protrusion.

The safety member can be formed by a wire spring element, of the hairpin type, a first portion of which is mechanically fastened to the second protrusion and a second portion of which is mechanically fastened to the locking and unlocking member.

The obstacle-forming wall can extend between the first portion of the safety member partially introduced into the second protrusion and the second portion of the safety member partially introduced into a port provided in the locking and unlocking member, so that the obstacle-forming wall prevents access to a space provided between the first portion and the second portion of the safety member.

The locking and unlocking member can have, at an end opposite to that by which it is hinged to the main plate, a hook-shaped finger which defines a space for passing the first portion of the safety member when the brake shoe is in its locked configuration.

The gripping portion can project from the finger so that in the locked configuration of the brake shoe, the gripping portion extends beyond the second protrusion and is easily accessible.

The mounting member is formed by a longitudinal groove, for example in the shape of a dovetail, formed in the inner face.

In a second aspect, one object of the invention is also a braking system for a railway vehicle having brakes with at least one lining, provided with a brake linkage and at least one brake shoe as described above, the system being configured to act on braking members of the vehicle, such as brake discs for example, via the brake linkage and the at least one brake shoe onto which at least one lining is installed and locked.

In a third aspect, one object of the invention is also a railway vehicle having brakes with at least one lining, including a braking system as described above, which is configured to act on the braking members of the vehicle, such as the brake discs, for example.

BRIEF DESCRIPTION OF THE FIGURES

The disclosure of the invention will now be continued by describing exemplary embodiments, given below by way of illustrating and not limiting purposes, with reference to the appended drawings.

DETAILED DESCRIPTION

Figure 1:
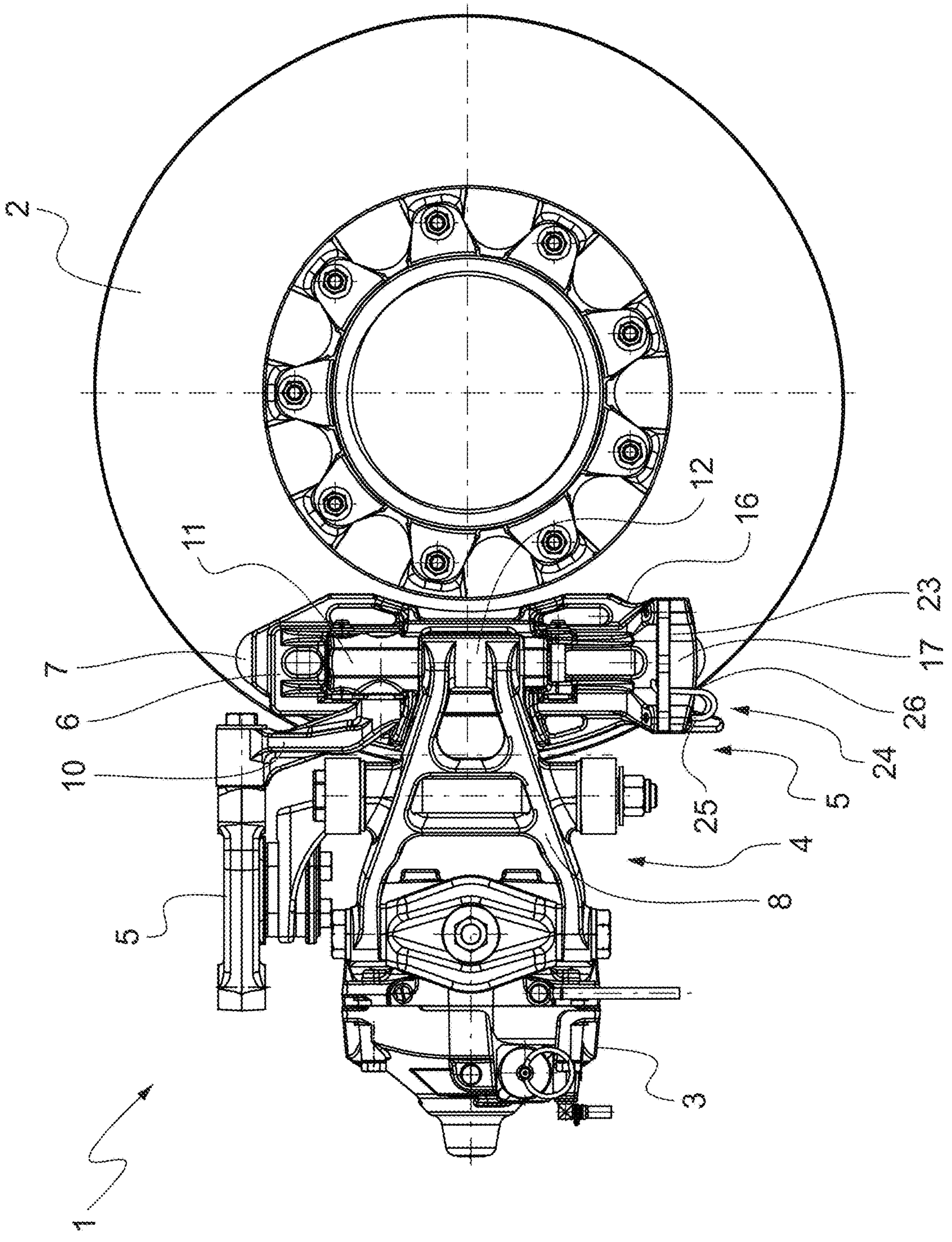
FIG. 1 described above partially illustrates a front view of this railway braking system provided especially with a brake linkage mounted to a brake disc of a railway vehicle, with the linings, of which only one is visible, fixedly installed onto the brake shoes, of which only one is visible, of the system.
Figure 2:
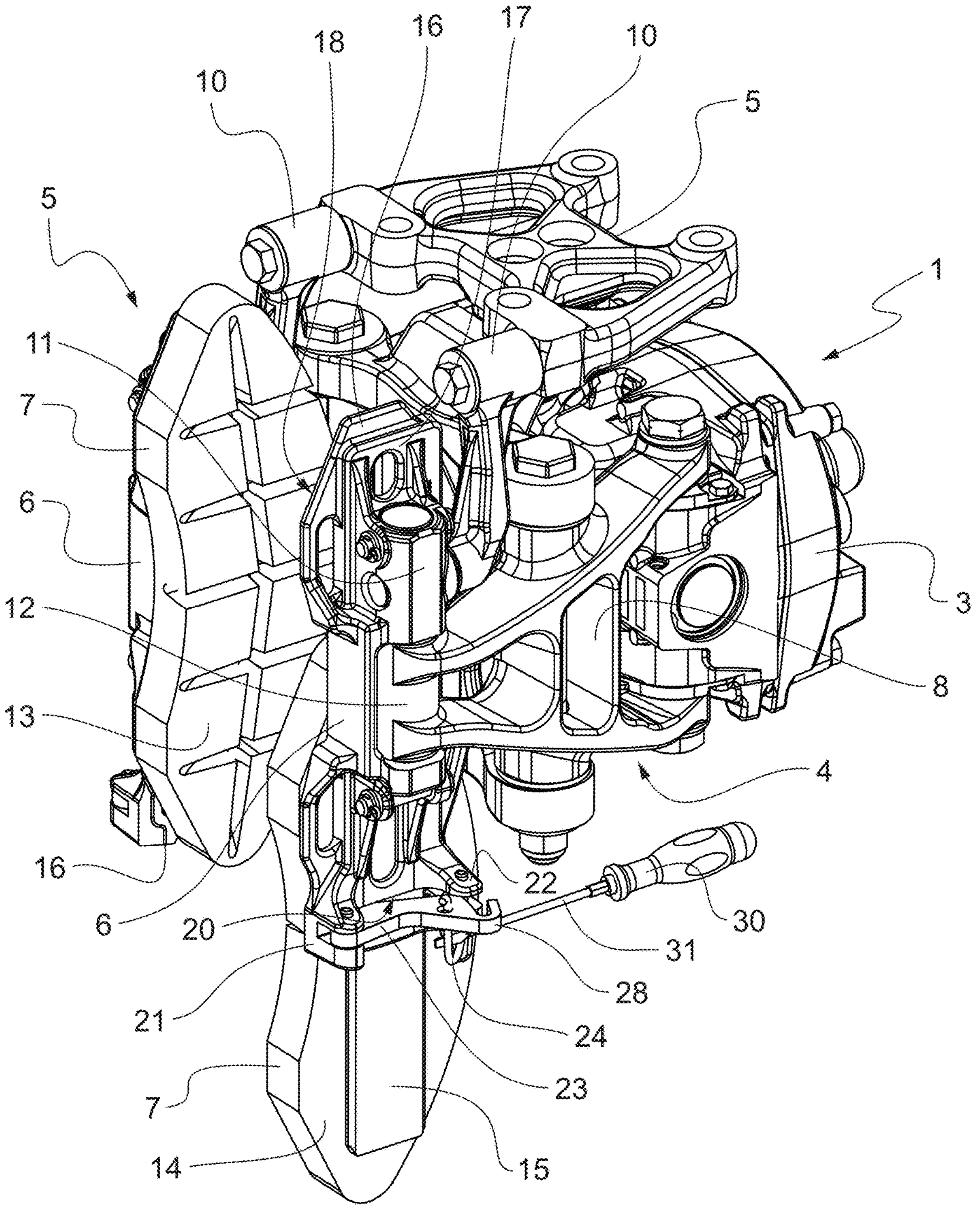
FIG. 2 described above shows the system alone, in perspective and with a lining fixedly mounted to a brake shoe and another lining removed from another brake shoe using a tool.
Figure 4:
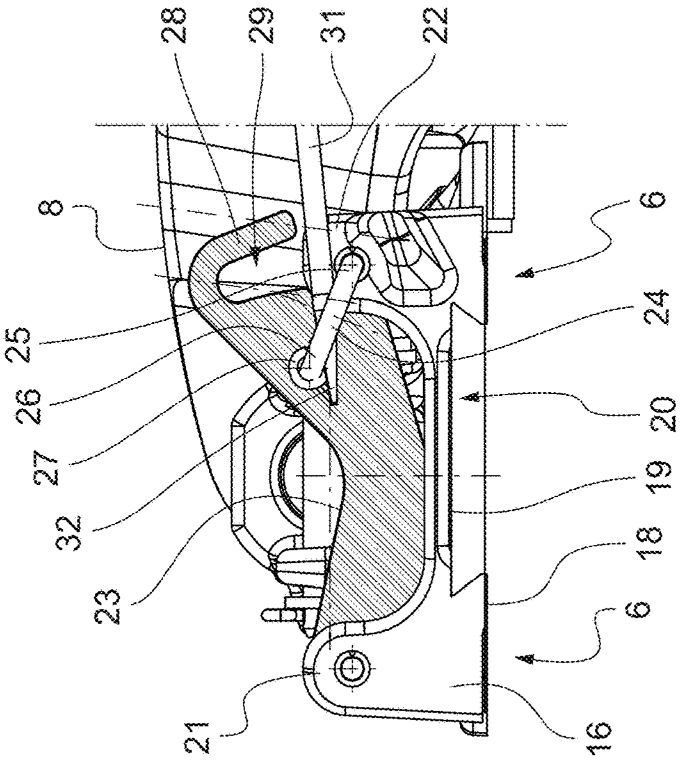
FIG. 4 described above is similar to FIG. 3, showing a second step in the action of unlocking the brake shoe, with the lining removed.
Figure 3:
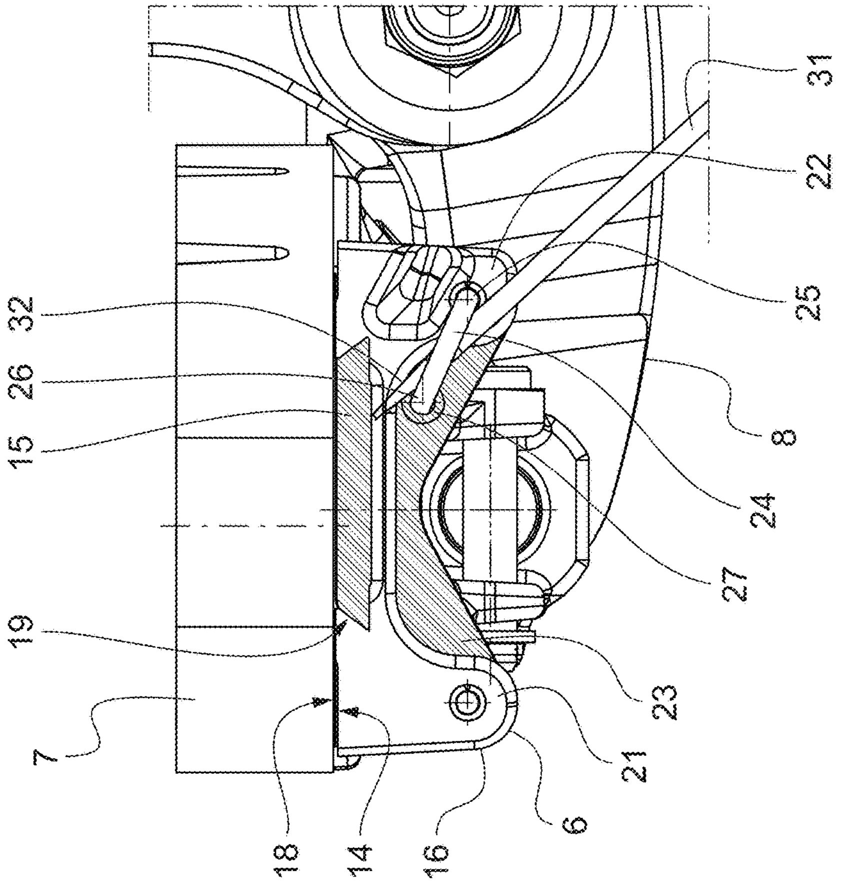
FIG. 3 described above is a partial bottom view of FIG. 2, showing a step in the action of unlocking the brake shoe to remove the lining still present.
Figure 6:
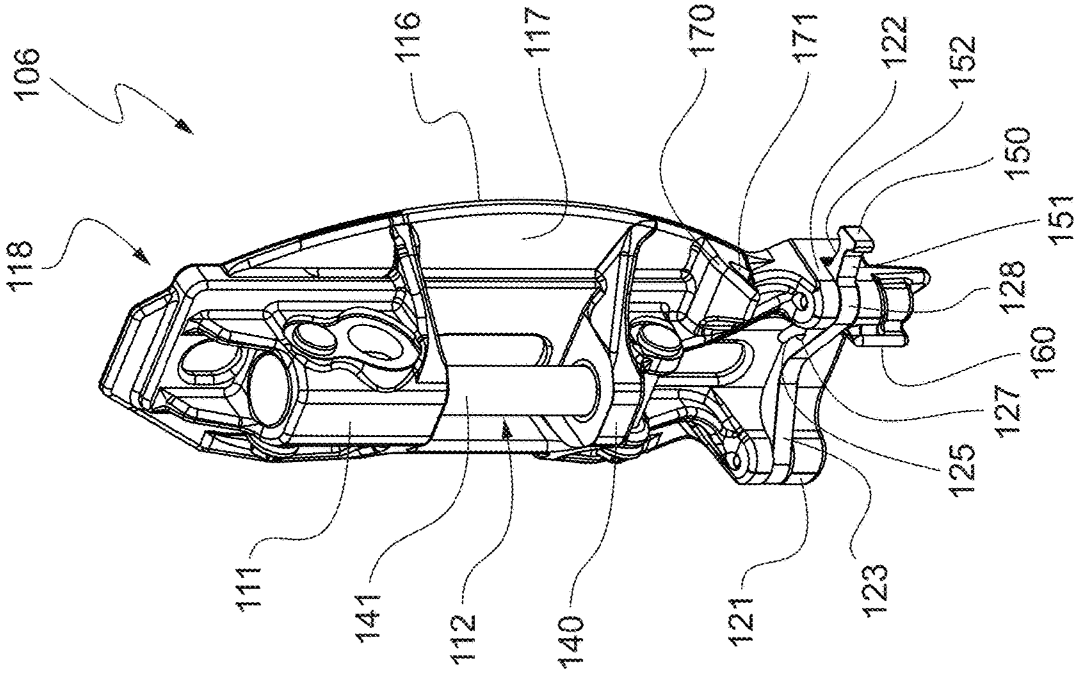
FIG. 6 is a view similar to FIG. 5, showing the brake shoe along a different viewing angle.
Figure 5:
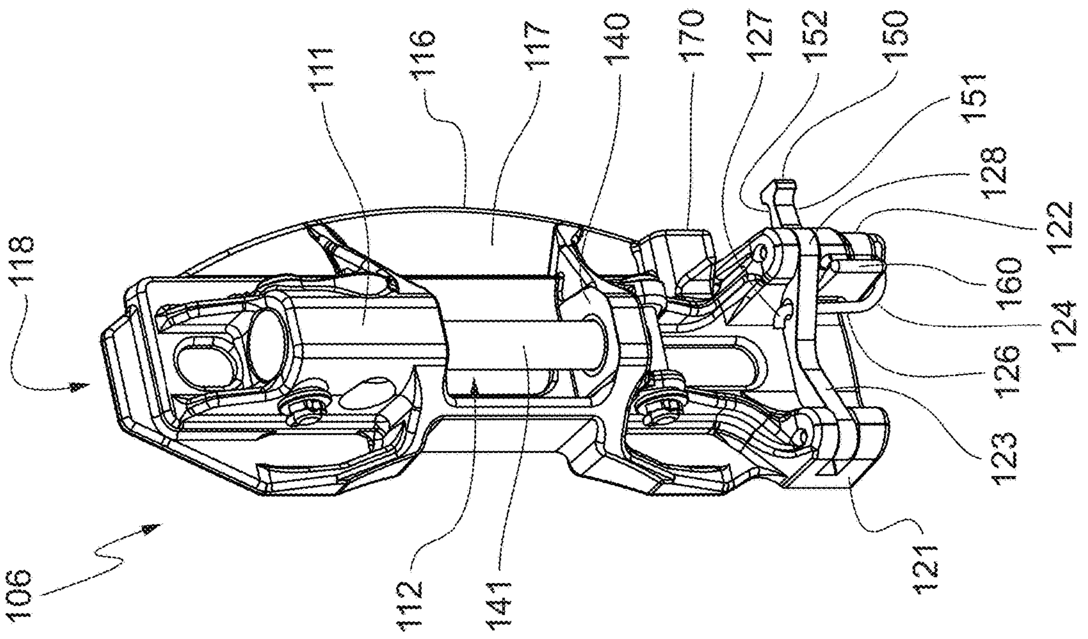
FIG. 5 illustrates in perspective and in isolation, a brake shoe configured to equip a system and intended to support a lining, as described with reference to FIGS. 1 to 4, according to an embodiment of the invention.

As explained above, FIGS. 1 to 4 illustrate a railway braking system of prior art.

However, the following description of FIGS. 5 to 13 is aimed at a brake shoe which is configured to be mounted to a railway braking system as described above, in place of the brake shoe described with reference to those figures.

A less detailed description, based on that made in the section reflecting prior art, will therefore be made of such a railway braking system before describing in more detail the brake shoe visible in FIGS. 5 to 13.

In particular, it can be a railway braking system mounted to a brake disc of a railway vehicle.

The brake disc can be mounted to an axle of the railway vehicle, or directly to a wheel to be braked.

The railway braking system can include a body forming a service brake cylinder and/or a parking brake cylinder, fed by a pneumatic duct network, and a brake linkage mechanically connected to the body.

The body can be in the form of an overall closed casing which is configured to be mechanically fastened to a support of the vehicle, for example a portion of the bogie or axle, via a fixing interface.

When the service brake and/or parking brake is actuated, the brake linkage is moved so as to act on the disc.

In particular, the brake linkage is provided with a lining device provided to apply forces to the brake disc when the linkage is actuated.

This device includes two brake shoes, to each of which linings are mechanically fastened.

The device, including the brake shoes and the linings, has a general longitudinal orientation and a general transverse orientation.

Each lining is designed to be applied in contact with one face of the disc to reduce its speed of rotation and consequently that of the wheel to be braked.

The brake linkage can include levers which extend from the body to the device and at one end of which the brake shoes are mechanically fastened.

Actuation of the levers can move the brake shoes towards and away from each other and the disc.

The system can include force transmission links mechanically fastened by a first respective end to the fixing interface (itself fastened to the support of the vehicle) and by a second respective end opposite to the first end to a respective brake shoe.

The linings are each provided with a leading face configured to be in contact with the brake disc and with a mounting face on which is provided a fixing rib longitudinally extending which may have a dovetail shape.

With reference to FIGS. 5 to 11, the brake shoe 106 in accordance with the invention is now described, as well as the installation and removal, locking and unlocking, of the lining (not represented) onto/from the brake shoe 106.

In particular, the brake shoe 106 is here provided with a main plate 116 having an outer face 117 and an inner face 118 opposite to the outer face 117.

On the outer face 117 of the main plate 116, an attachment lug 111 for mechanically fastening the link, an attachment zone 112 for mechanically fastening the lever, and a mounting base 140 are provided, with the attachment zone 112 being interposed between the mounting base 140 and the attachment lug 111.

The brake shoe 106 includes a mounting pin 141 extending longitudinally in the attachment zone 112 from the mounting base 140 to the level of the attachment lug 112 where it is introduced into a port provided in the attachment lug 112.

The mounting pin 141 is provided for mechanically fastening the lever.

The brake shoe 106 further includes a mounting member formed here by a longitudinal groove 119 formed in the inner face 118, for example having a dovetail shape, and complementary to a complementary mounting member formed for example by a fixing rib of the lining, and provided for slidingly receiving this fastening rib for installing the lining onto the brake shoe 106, on the side of its inner face 118.

The brake shoe 116 is further provided with a window 120 provided in the main plate 116 and opening on either side into the inner and outer faces 118 and 117 and into the longitudinal groove 119 provided in the inner face 118.

The brake shoe 116 is further provided with a first protrusion 121 and a second protrusion 122 provided projecting from the outer face 117 of the main plate 116.

The first protrusion 121 and the second protrusion 122 are here disposed on either side of the window 120, along the transverse direction of the brake shoe 106.

The brake shoe 106 is here arranged so that the attachment zone 112 and the mounting base 140 are interposed between the attachment lug 111 and the first and second protrusions 121 and 122.

The first and second protrusions 121 and 122 each have a knuckle shape, each having an upper knuckle and a lower knuckle at a distance from each other.

The brake shoe 106 is further provided with a locking and unlocking member 123 hingedly mounted to the first protrusion 121, between its upper and lower knuckles, and extending along the transverse direction from the first protrusion 121 to the second protrusion 122.

The brake shoe 106 is further provided with a safety member 124 formed here by a wire spring element, of the hairpin type, a first portion 125 of which is mechanically fastened to the second protrusion 122 and a second portion 126 of which is mechanically fastened to the locking and unlocking member 123.

In particular, the first portion 125 of the safety member 124 is introduced and fixed between the upper and lower knuckles formed by the second protrusion 122, while the second portion 126 is introduced and fixed into a port 127 provided in the locking and unlocking member 123.

The safety member 124 is here generally U-shaped, with the first and second portions 125 and 126 forming the arms of the U.

The locking and unlocking member 123 has, at an end opposite to that by which it is hinged to the first protrusion 121, a hook-shaped finger 128 which defines a space 129 for passing the first portion 125 of the safety member 124 when the brake shoe 106 is in a locked configuration (as in FIGS. 5 to 8 and 11).

In such a locked configuration, a portion of the locking and unlocking member 123 passes through the window 120 and comes in tight abutment against a portion of the rib for fixing the lining (not visible here), so as to hold the latter in position on the brake shoe 106.

Furthermore, in such a locked configuration, the finger 128 of the locking and unlocking member 123 is introduced into the upper and lower knuckles formed by the second protrusion 122, with the first portion 125 of the safety member 124 being received in the space 129 defined by the finger 128.

In this locked configuration, the attachment points of the safety member 124 are such that this member is in a first stable position in which it stresses the locking and unlocking member 123 against the lining (not visible).

The locking and unlocking member 123 is further provided with a handling member 150, or gripping portion, projecting from the finger 128 so that in the locked configuration of the brake shoe 106, the handling member 150 extends beyond the second protrusion 122 and is easily accessible.

The handling member 150 has a locking face 151 and an unlocking face 152 opposite to the locking face 151, each extending from the finger 128.

The locking and unlocking faces 151 and 152 have an overall curved, rather concave shape directed towards the handling member.

In the example illustrated, the brake shoe 106 is further provided with an obstacle-forming wall 160 which projects from the outer face 117 of the main plate 116 and which extends in the immediate proximity of the second protrusion 122.

The brake shoe 106 is arranged so that the obstacle-forming wall 160 extends between the first portion 125 of the safety member 124 partially introduced into the second protrusion 122 and the second portion 126 of the safety member 124 partially introduced into the port 127 provided in the locking and unlocking member 123.

Thus, the obstacle-forming wall 160 prevents access to a space provided between the first portion 125 and the second portion 126 of the safety member 124.

In the example illustrated, the brake shoe 106 is further provided with a positioning stop 170 which projects from the outer face 117 of the main plate 116 and which here extends at a distance from the second protrusion 122.

The brake shoe 106 is arranged so that the positioning stop 170 is substantially facing the second protrusion 122 and at least partially opposite the handling member 150.

The positioning stop 170 has here a substantially curved shape towards the second protrusion 122 so as to form a housing 171.

Figure 9:
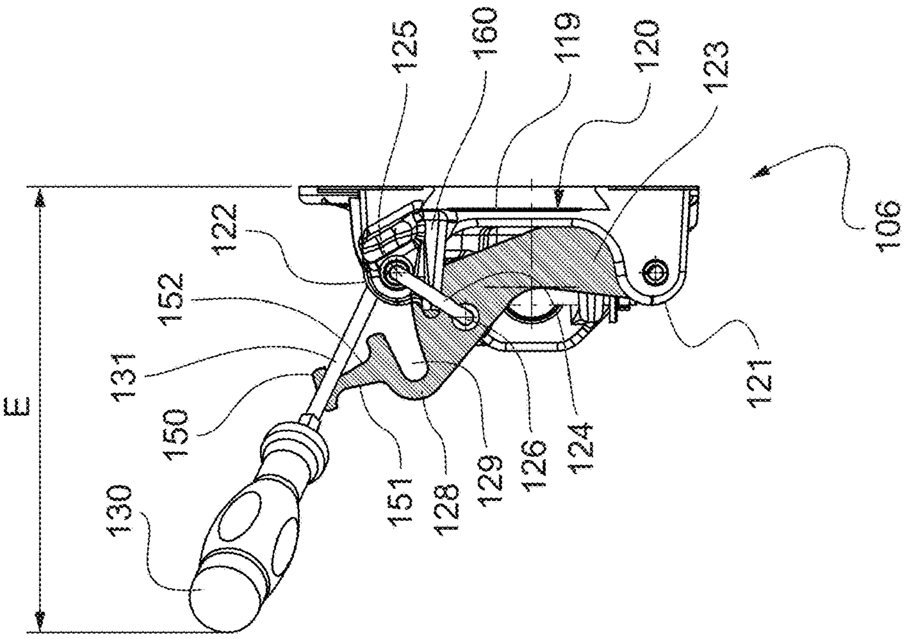
FIG. 9 is similar to FIG. 8, but with the brake shoe in the unlocked configuration and the tool in a second unlocking position.
Figure 10:
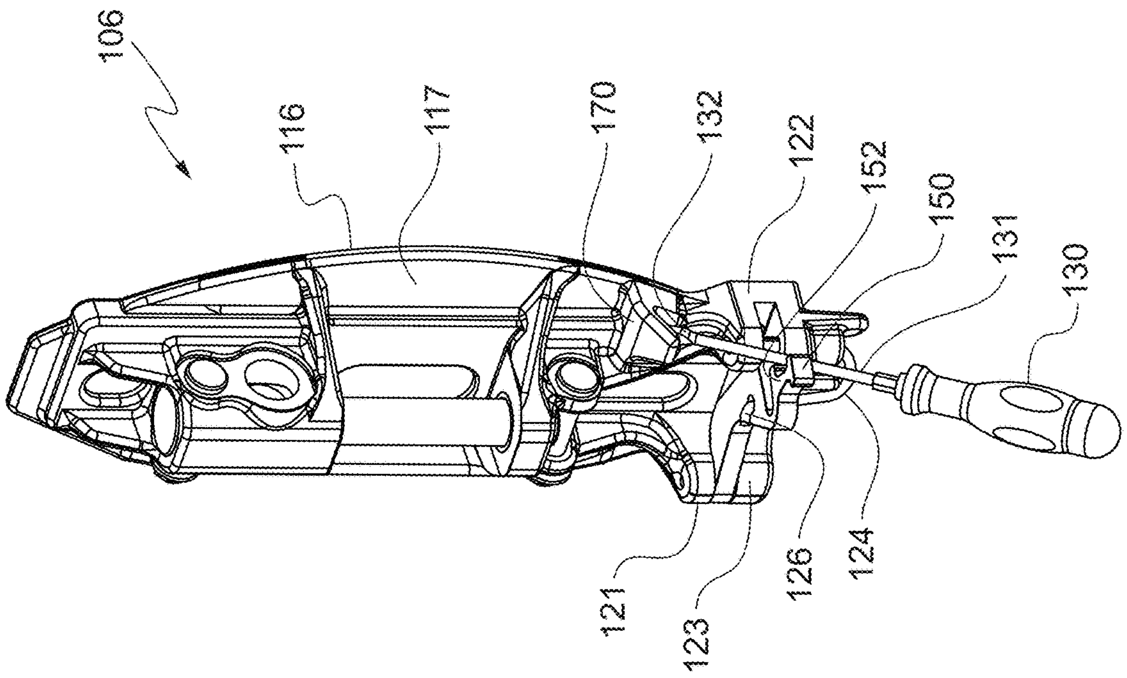
FIG. 10 illustrates in perspective the brake shoe, in its unlocked configuration, and the tool as in FIG. 8 in its second unlocked position.

To replace a lining, it is necessary to use a tool, for example of the screwdriver type, in order to switch the respective brake shoe 106 from its locked configuration (FIGS. 5 to 8 and 11) to an unlocked configuration (FIGS. 9 and 10).

In particular, a screwdriver 130 fitted with a shank 131 is used here.

The shank 131 of the screwdriver 130 is provided with an end 132 which is introduced into the housing 171 of the positioning stop 170, with the shank 131 being placed in abutment against the unlocking face 152 of the handling member 150. The screwdriver 130 is then in a first unlocking position.

Sufficient force has to be exerted to move the handling member 150 sufficiently and hereby movably drive the locking and unlocking member 123 and thus the second portion 125 of the safety member 124 until the latter no longer stresses the locking and unlocking member 123 towards the window 120 and thus towards the lining (not visible), and until the finger 128 is extracted from the second protrusion 122.

Figure 8:
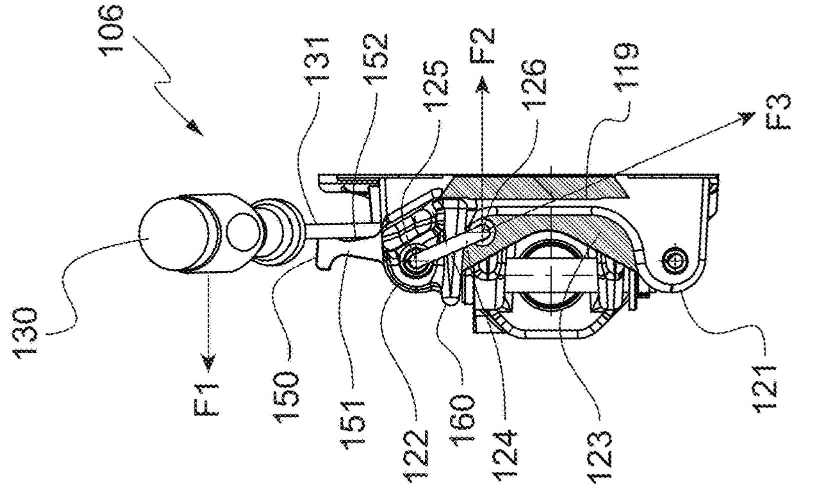
FIG. 8 is similar to FIG. 7, but showing a bottom view of the brake shoe with the tool engaged on the latter in its first unlocked position.
Figure 7:
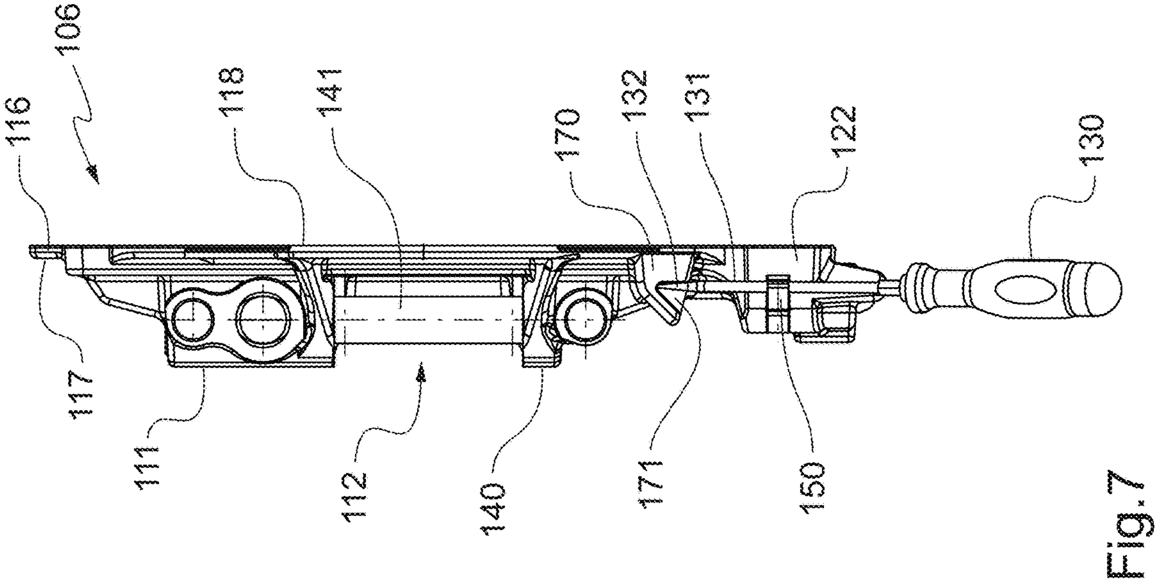
FIG. 7 is a side view of the brake shoe illustrated in FIGS. 5 and 6, with a tool engaged on the latter in a first unlocking position of the brake shoe.

FIG. 8 represents the necessary force F1 to be exerted with the screwdriver 130 to move the locking and unlocking member 123 against the forces F2 and F3 exerted by the safety member 124.

The screwdriver 130 does not act directly on the safety member 124, thus avoiding any damage to the latter.

Moreover, in the example illustrated, it is not possible to act directly on the safety member 124 due to the presence of the obstacle-forming wall 160 which prevents the insertion of the shank 131 of the screwdriver 130.

Furthermore, the positioning stop 170 can be used as an anti-shifting device when the screwdriver 130 is actuated, making the action of locking or unlocking the brake shoe 106 even more secure.

In FIG. 9, the screwdriver 130 is shown in a second unlocking position after actuation. This shows that a particularly small overall size E is required to switch the brake shoe 106 from its locked configuration to its unlocked configuration.

In the unlocked configuration of the brake shoe 106, as visible in FIGS. 9 and 10, the attachment points of the safety member 124 are such that this member is in a second stable position in which it stresses the locking and unlocking member 123 at a distance from the window 120 and therefore from the lining (not visible).

In other words, the finger 128 is extracted from the second protrusion 122, the locking and unlocking member 123 no longer stresses the lining (not visible), which can thus be removed from the brake shoe 106 for replacement.

Figure 11:
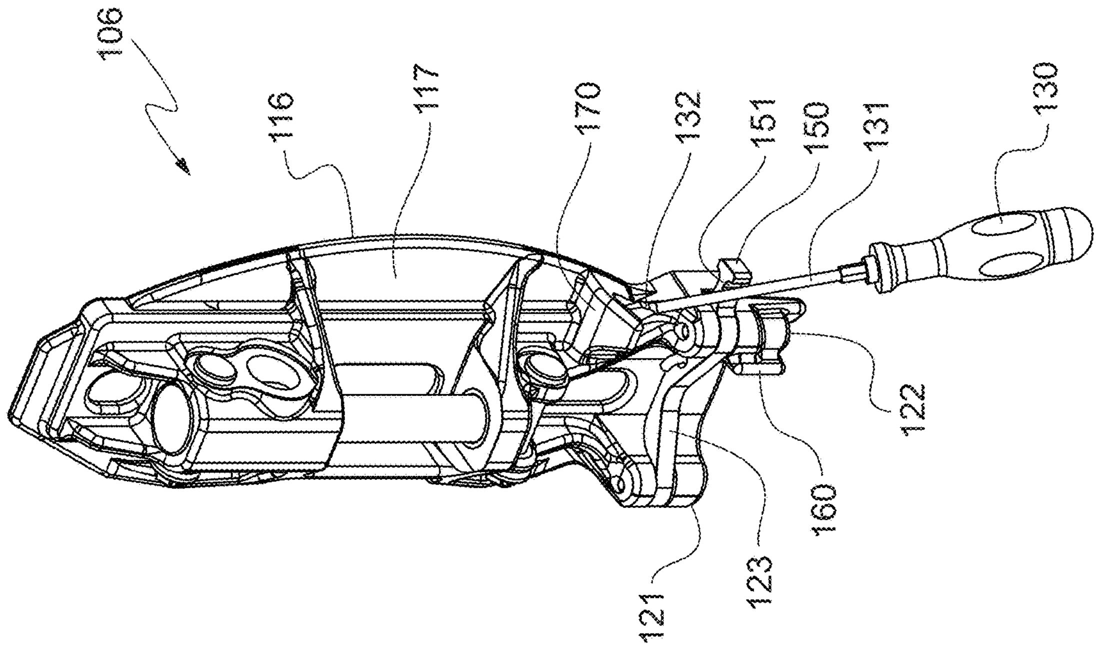
FIG. 11 is similar to FIG. 10, except that the brake shoe is in its locked configuration and the tool is engaged on the latter in a second locking position of the brake shoe.

FIG. 11 illustrates the locking of the brake shoe 106 after the lining (not visible) has been replaced.

The screwdriver 130 thus switches from a first locking position not represented but which is identical to that of FIG. 10, except that the shank 131 of the screwdriver 130 is in abutment against the locking face 151 of the handling member 150 rather than against its unlocking face 152, to a second locking position visible in FIG. 11.

In other words, the aim here is to stress the locking and unlocking member 123 and its second portion 125 in the opposite direction to that of the previous figures, in order to bring the locking and unlocking member 123 closer to the window 120 and therefore to the lining (not visible).

Figure 12:
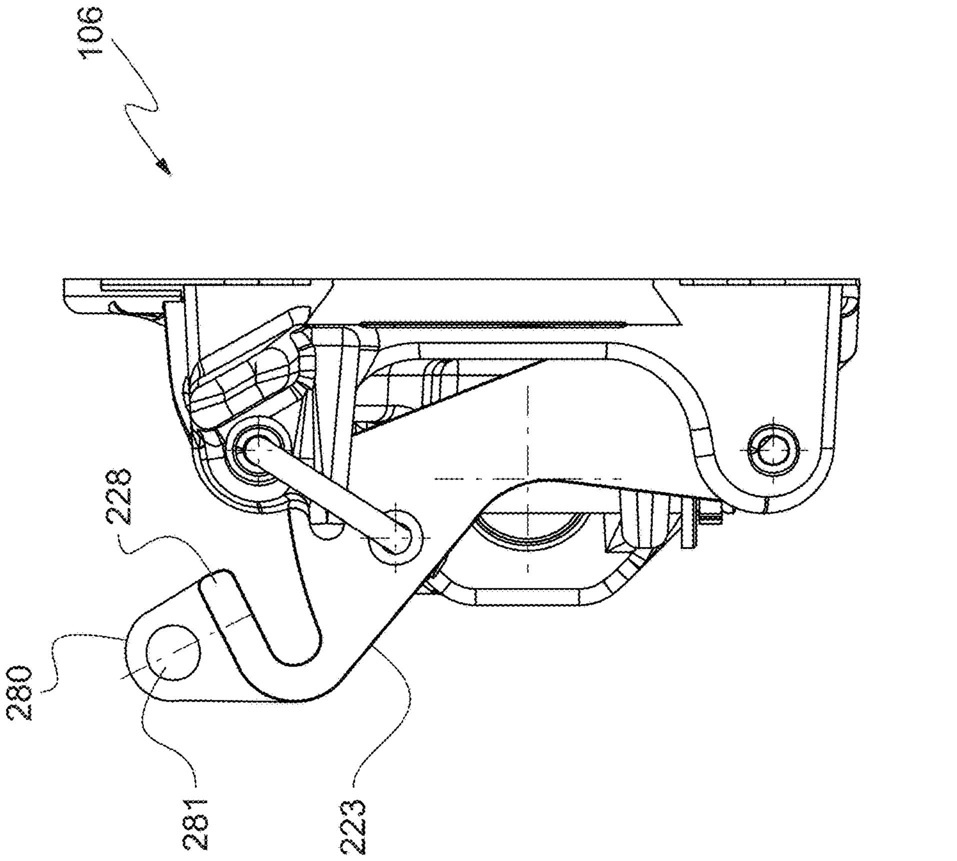
FIG. 12 illustrates a bottom view of a brake shoe according to an alternative embodiment.

The brake shoe 106 illustrated in FIG. 12 differs from that illustrated in FIGS. 5 to 11 in that it is provided with a locking and unlocking member 223 which has a handling lug 280, or gripping portion, having a through port 281 rather than the handling member described above.

In this alternative, the screwdriver shank is introduced into the through port 281 rather than onto a locking/unlocking face.

The movement is quite similar to switch the brake shoe from one configuration to the other.

Figure 13:
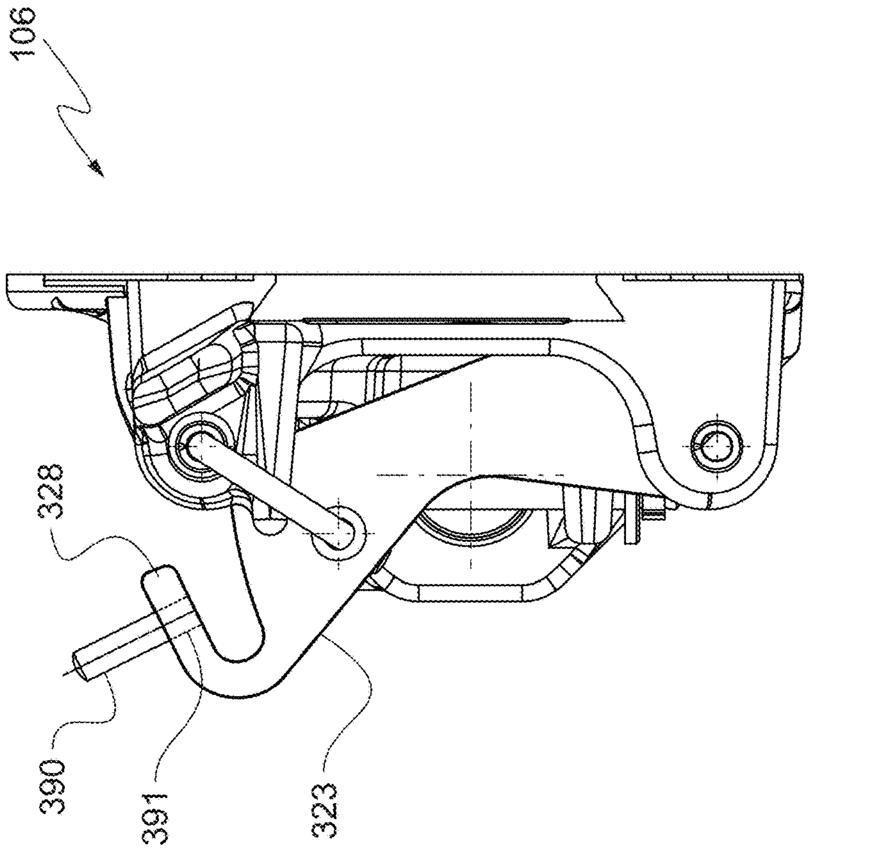
FIG. 13 is a view similar to FIG. 12, showing another alternative embodiment of the brake shoe.

The brake shoe 106 illustrated in FIG. 13 differs from that illustrated in FIGS. 5 to 11 and from that illustrated in FIG. 12 in that it is provided with a locking and unlocking member 323 which has a handling rod 390, or gripping portion, fixed integrally in a hole 391 provided in the hook 328 rather than the handling member or handling lug described above.

In this alternative, the screwdriver shank comes in abutment against one side or the other of the handling rod 390 to switch the brake shoe from one configuration to the other.

Alternatives not illustrated are described below.

The brake shoe can be devoid of a positioning stop and/or an obstacle-forming wall.

The brake shoe can be devoid of an attachment lug and/or an attachment zone and/or a mounting base such as those described above.

The safety member has a general shape other than a U, for example an S. It may be a hairpin or a cotter pin.

The first and second protrusions may not form knuckles, but rather, for example, lugs to which the locking and unlocking member would be fixed.

The lining can be fixed with a rib/groove mechanism different from a dovetail shape, for example with ribs/grooves having circular, rectangular or more generally ramped side faces.

More generally, the invention is not limited to the examples described and represented.

The invention claimed is:

1. A brake shoe configured to equip a railway braking system for a railway vehicle and to act on at least one braking member of said railway vehicle, including a main plate (116) having an outer face (117) and an inner face (118) opposite to the outer face (117), a mounting member (119) provided on the inner face (118) and configured to receive a complementary member for mounting a lining equipping the railway braking system, and a locking and unlocking mechanism configured to install/remove and lock/unlock the lining onto/from the brake shoe (106), the locking and unlocking mechanism including a locking and unlocking member (123, 223, 323) hingedly mounted with respect to the main plate (116) and extending in a transverse direction of the brake shoe (106), and a safety member (124) mechanically fastened to the main plate (116) and to the locking and unlocking member (123, 223, 323), with the brake shoe configured to assume a locked configuration in which the safety member (124) stresses the locking and unlocking member (123, 223, 323) towards the main plate (116) into a locking position where the locking and unlocking member (123, 223, 323) is configured to be in abutment against the lining, and an unlocked configuration in which the safety member (124) stresses the locking and unlocking member (123, 223, 323) to place it at a first distance from the main plate (116) into an unlocked position where the locking and unlocking member (123, 223, 323) is configured to be at a second distance from the lining, wherein the locking and unlocking member (123) is provided with a gripping portion (150, 280, 390) which projects transversely beyond the main plate (116), and which is configured to move the locking and unlocking member (123, 223, 323) and the safety member (124) together in order to switch the brake shoe (106) from one of its locked and unlocked configurations to the other, when subjected to an external stress.

2. The brake shoe of claim 1, wherein the gripping portion is formed by a handling member (150) which has a locking face (151) and an unlocking face (152) opposite to the locking face (151).

3. The brake shoe of claim 2, wherein the locking face (151) and the unlocking face (152) have an overall curved shape configured to facilitate the positioning of a tool.

4. The brake shoe of claim 1, wherein the gripping portion is formed by a handling lug (280) having a through port (281) for introducing a tool.

5. The brake shoe of claim 1, wherein the gripping portion is formed by a handling rod (390) fixed integrally in a hole provided in the locking and unlocking member (323), against which handling rod (390) a tool comes in abutment in order to switch the brake shoe from one of its locked and unlocked configurations to the other.

6. The brake shoe of claim 1, further comprising a first protrusion (121) and a second protrusion (122) provided projecting from the outer face (117), wherein the locking and unlocking member (123) is hingedly mounted to the first protrusion (121) and extends along the transverse direction from the first protrusion (121) to the second protrusion (122).

7. The brake shoe of claim 6, further comprising a window (120) provided in the main plate (116) and opening on either side into the inner face (118) and into the outer face (117) and located facing the mounting member (119).

8. The brake shoe of claim 7, wherein the first protrusion (121) and the second protrusion (122) are disposed on either side of the window (120), in the transverse direction of the brake shoe (106).

9. The brake shoe of claim 6, further comprising a positioning stop (170) which projects from the outer face (117) of the main plate (116) and which extends at a third distance from the second protrusion (122).

10. The brake shoe of claim 9, wherein the positioning stop (170) is substantially facing the second protrusion (122) and at least partially opposite the gripping portion (150, 280, 390).

11. The brake shoe of claim 9, wherein the positioning stop (170) has a shape substantially curved towards the second protrusion (122) so as to form a housing (171) configured to accommodate an end of a tool.

12. The brake shoe of claim 6, further comprising an obstacle-forming wall (160) which projects from the outer face (117) of the main plate (116) and which extends in an immediate proximity of the second protrusion (122).

13. The brake shoe of claim 12, wherein the safety member (124) is formed by a hairpin-type wire spring element, a first portion (125) of which is mechanically fastened to the second protrusion (122) and a second portion (126) of which is mechanically fastened to the locking and unlocking member (123).

14. The brake shoe of claim 13, wherein the obstacle-forming wall (160) extends between the first portion (125) of the safety member (124) partially introduced into the second protrusion (122) and the second portion (126) of the safety member (124) partially introduced into a port (127) provided in the locking and unlocking member (123), so that the obstacle-forming wall (160) prevents access to a space provided between the first portion (125) and the second portion (126) of the safety member (124).

15. The brake shoe of claim 13, wherein the locking and unlocking member (123) has, at an end opposite to that by which it is hinged to the main plate (116), a hook-shaped finger (128) which defines a space (129) for passing the first portion (125) of the safety member (124) when the brake shoe (106) is in its locked configuration.

16. The brake shoe of claim 15, wherein the gripping portion (150, 280, 390) extends projecting from the hook-shaped finger (128) so that, in the locked configuration of the brake shoe (106), the gripping portion (150, 280, 390) extends beyond the second protrusion (122) and is easily accessible.

17. The brake shoe of claim 1, wherein the mounting member (119) is formed by a longitudinal groove, for example having a dovetail shape, formed in the inner face (118).

18. A braking system for a railway vehicle having brakes with at least one lining, provided with a brake linkage and the brake shoe (106) of claim 1, wherein the braking system is configured to act on braking members of the railway vehicle via the brake linkage and the brake shoe (106) onto which the at least one lining is installed and locked.

19. A railway vehicle having brakes with at least one lining, including the braking system of claim 18 and which is configured to act on the braking members of the railway vehicle.

* * * * *